(12) United States Patent
Dreps et al.

(10) Patent No.: US 7,208,972 B2
(45) Date of Patent: Apr. 24, 2007

(54) CIRCUIT FOR GENERATING A TRACKING REFERENCE VOLTAGE

(75) Inventors: Daniel M. Dreps, Georgetown, TX (US); Anand Haridass, Austin, TX (US); Bao G. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 10/845,568

(22) Filed: May 13, 2004

(65) Prior Publication Data

US 2005/0253622 A1 Nov. 17, 2005

(51) Int. Cl.
*H03K 17/16* (2006.01)

(52) U.S. Cl. ............... 326/26; 326/30; 326/82
(58) Field of Classification Search ............ 326/21, 326/26, 27, 30, 82, 83
See application file for complete search history.

(56) References Cited

U.S. PATENT DOCUMENTS

| | | | |
|---|---|---|---|
| 6,492,846 B1 * | 12/2002 | Taguchi et al. | 327/112 |
| 6,985,009 B2 * | 1/2006 | Nishio et al. | 326/30 |
| 2004/0264267 A1 * | 12/2004 | Nishio et al. | 365/200 |
| 2006/0082383 A1 * | 4/2006 | Choi | 326/30 |

* cited by examiner

*Primary Examiner*—Don Le
(74) *Attorney, Agent, or Firm*—Richard F. Frankeny; Winstead Sechrest & Minick P.C.

(57) ABSTRACT

Two or more integrated circuit (IC) chips are separated by a significant distance relative to their communication frequency such that pseudo-differential signaling is used to improve signal detection. A derived reference voltage is generated that tracks the variations of the driver and receiver side power supply variations that normally reduce noise margins. The derived reference voltage is filtered to reduce high frequency response and coupled as the reference to differential receivers used to detect the logic levels of the communication signals.

20 Claims, 3 Drawing Sheets

CIRCUIT FOR GENERATING A TRACKING REFERENCE VOLTAGE

TECHNICAL FIELD

The present invention relates in general to board level transmission line drivers and receivers, and in particular, to references for pseudo-differential drivers and receivers.

BACKGROUND INFORMATION

Digital computer systems have a history of continually increasing the speed of the processors used in the system. As computer systems have migrated towards multiprocessor systems, sharing information between processors and memory systems has also generated a requirement for increased speed for the off-chip communication networks. Designers usually have more control over on-chip communication paths than for off-chip communication paths. Off-chip communication paths are longer, have higher noise, impedance mismatches, and have more discontinuities than on-chip communication paths. Since off-chip communication paths are of lower impedance, they require more current and thus more power to drive.

When using inter-chip high-speed signaling, noise and coupling between signal lines (cross talk) affects signal quality. One way to alleviate the detrimental effects of noise and coupling is through the use of differential signaling. Differential signaling comprises sending a signal and its compliment to a differential receiver. In this manner, noise and coupling affect both the signal and the compliment equally. The differential receiver only senses the difference between the signal and its compliment as the noise and coupling represent common mode signals. Therefore, differential signaling is resistant to the effects that noise and cross talk have on signal quality. On the negative side, differential signaling increases pin count by a factor of two for each data line. The next best thing to differential signaling is pseudo-differential signaling. Pseudo-differential signaling comprises comparing a data signal to a reference voltage using a differential receiver or comparator.

When high speed data is transmitted between chips, the signal lines are characterized by their transmission line parameters. High speed signals are subject to reflections if the transmission lines are not terminated in an impedance that matches the transmission line characteristic impedance. Reflections may propagate back and forth between driver and receiver and reduce the margins when detecting signals at the receiver. Some form of termination is therefore usually required for all high-speed signals to control overshoot, undershoot, and increase signal quality. Typically, a Thevenin's resistance (equivalent resistance of the Thevenin's network equals characteristic impedance of transmission line) is used to terminate data lines allowing the use of higher valued resistors. Additionally, the Thevenin's network is used to establish a bias voltage between the power supply rails. In this configuration, the data signals will then swing around this Thevenin's equivalent bias voltage. When this method is used to terminate data signal lines, a reference voltage is necessary to bias a differential receiver that operates as a pseudo-differential receiver to detect data signals in the presence of noise and cross talk.

The logic levels of driver side signals are determined by the positive and ground voltage potentials of the driver power supply. If the driver power supply has voltage variations that are unregulated, then the logic one and logic zero levels of the driver side signals will undergo similar variations. If the receiver is substantially remote from the driver such that its power supply voltage may undergo different variations from the driver side power supply, then additional variations will be added to any signal received in a receiver side terminator (e.g., Thevenin's network). These power supply variations will reduce noise margins if the reference has variations different from those on the received signals caused by the driver and receiver side power supply variations.

There is, therefore, a need for a circuit for generating a reference for Thevenin's terminated signal lines that tracks variations of the data lines to allow a differential receiver to more reliably detect data signals within these noise variations.

SUMMARY OF THE INVENTION

The present invention generates a derived reference voltage for use in pseudo-differential signaling wherein a driver in one integrated circuit chip generates a signal that is communicated to a receiver in another integrated circuit chip over high speed circuit transmission lines between the two integrated circuit chips. The derived reference is generated as a voltage potential between the power supply rails with a source resistance substantially equal to the source resistance of Thevenin's resistance terminators used for the data signals. A data signal driver for data signals couples power supply noise from its driver side chip power supply to its signal line and this noise propagates with a data signal to one input of its corresponding differential receiver. To generate the positive side of the derived reference for the differential receiver, a first driver like the data driver is configured to generate a direct current (DC) logic one output corresponding to the driver side chip positive power supply rail voltage. A second driver like the data driver is configured to generate a DC logic zero corresponding to the driver side chip ground power supply rail voltage. The first and second driver outputs are coupled to two signal lines which conduct the logic one and logic zero potentials from the driver side chip to the receiver side chip. The first driver logic one output and the second driver logic zero output are coupled to Thevenin's resistor networks equivalent to those used to terminate active signal lines. An additional resistor divider is connected between the first driver logic one and second logic zero to generate the derived reference voltage. Capacitors are coupled across the resistor divider to provide low pass filtering. Noise from the driver side chip and the receiver side chip are therefore coupled to the signal lines and the corresponding reference voltage such that the common mode rejection of the differential receiver reduces noise and enables more reliable signal detection.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
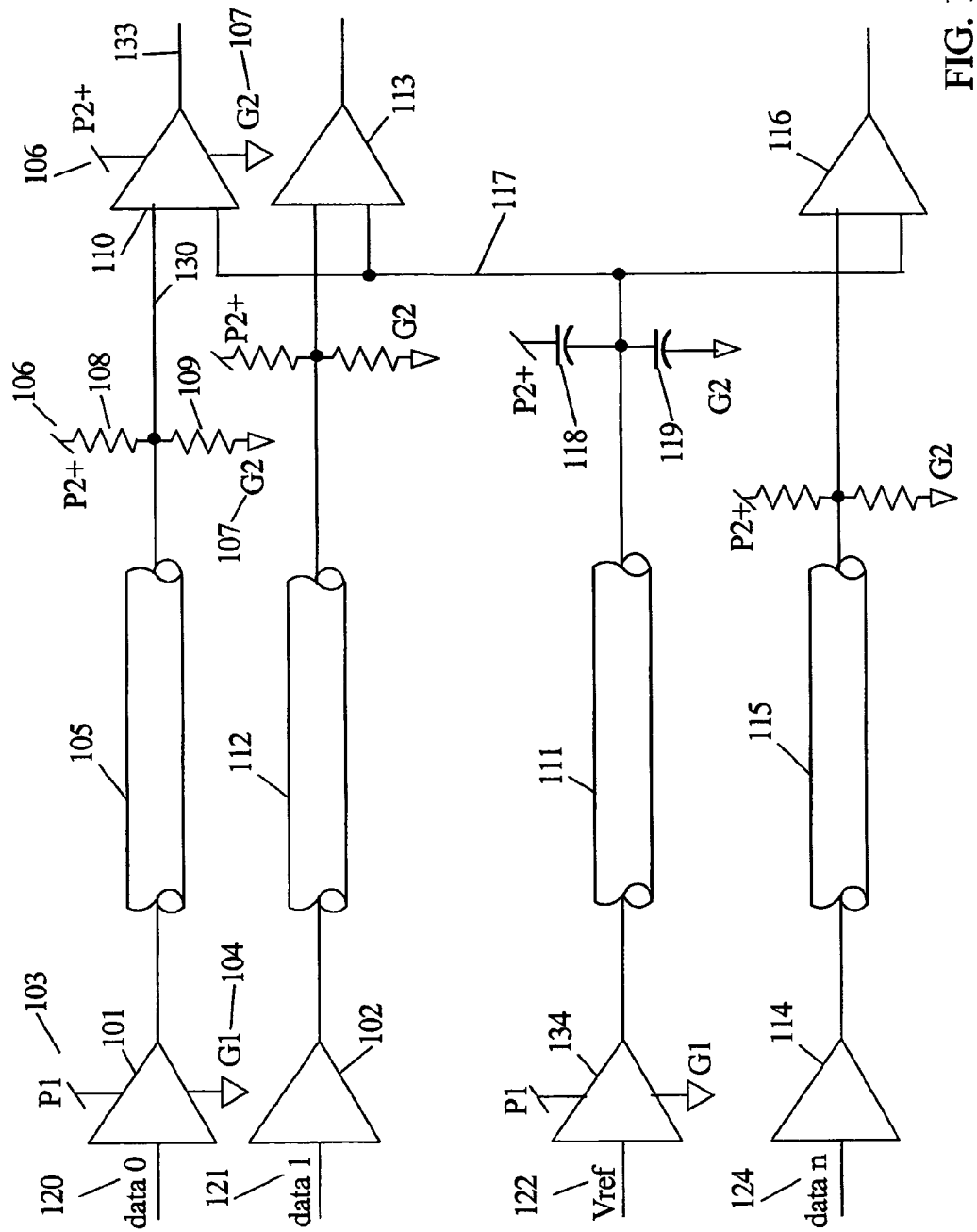
FIG. 1 is a circuit diagram of prior art pseudo-differential signaling with Thevenin's equivalent resistive divider termination.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a circuit diagram of typical pseudo-differential signaling for transmitting data from a driver to a receiver. Drivers 101, 102 and 114 represent three of a number of n drivers sending data to receivers 110, 113 and 116, respectively. Exemplary driver 101 receives data 0 120 and generates an output that swings between power supply rail voltages P1 103 (logic one) and G1 104 (logic zero). When the output of driver 101 is at P1 103, any noise on the power bus is coupled to transmission line 105 along with the logic state of the data signal. Exemplary transmission line 105 is terminated with a voltage divider comprising resistors 108 and 109. Receiver input 130 has a DC bias value determined by the voltage division ratio of resistors 108 and 109 and the voltage between P2 106 and G2 107. Receiver 110 is powered by voltages P2 106 and G2 107 which may have different values from P1 103 and G1 104 due to distribution losses, noise coupling, and dynamic impedance of the distribution network. Exemplary receiver 110 is typically a voltage comparator or high gain amplifier that amplifies the difference between a signal at input 130 and a reference voltage at node 117. Voltage reference Vref 122 may be buffered with amplifier 134 and distributed via line 111 to the exemplary receivers 110, 113 and 116. While Vref 122 may be a stable reference, it normally may not track variations in power supply P1 103. Likewise, the noise on line 111 coupled to node 117 will likely be different than the noise coupled to a data line (e.g., 105). While capacitors 118 and 119 may reduce high frequency noise on node 117, variations in power supply voltage P2 106 are not tightly coupled to node 117. The variations in power supply voltages P1 103 and P2 106 are coupled to the data inputs (e.g., 130) differently than variations are coupled to node 117. Likewise, power supply noise is coupled to the data inputs differently and thus noise and power supply variations do not manifest themselves as common mode signals that may be reduced by the common mode rejection capabilities of the differential receivers (e.g., 110, 113, and 116). This reduces the effectiveness of pseudo-differential signaling.

Figure 2:
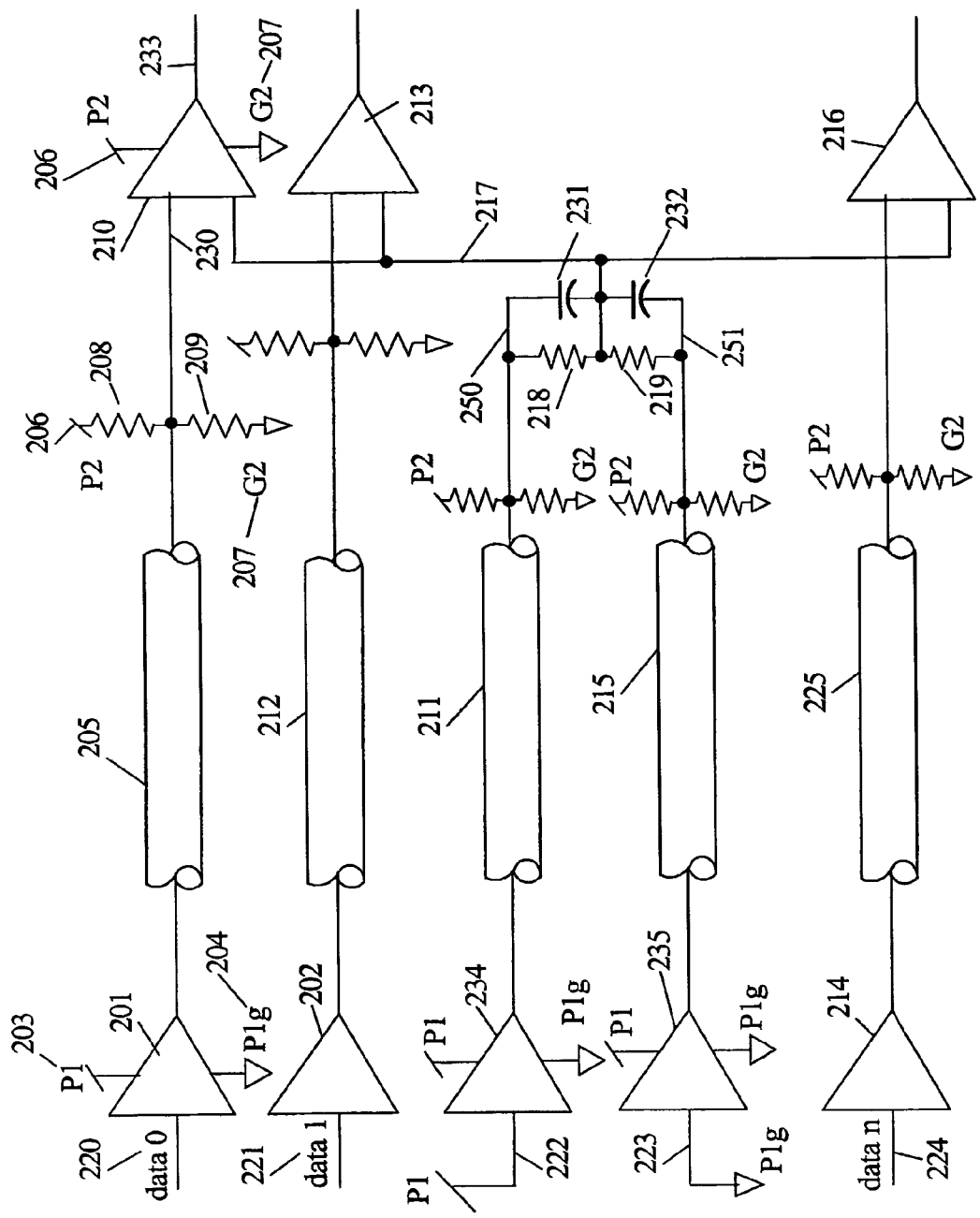
FIG. 2 is a circuit diagram of pseudo-differential signaling according to embodiments of the present invention.

FIG. 2 is a circuit diagram of pseudo-differential signaling according to embodiments of the present invention. Drivers 201, 202 and 214 transmit data signals data 0 220, data 1 221, and data n 224 to receivers 210, 213 and 216 via transmission lines 205, 212, and 225. Exemplary drivers 201, 202, and 214 are characterized as having driver outputs that switch between their power supply voltage potentials (e.g., P1 203 and G2 204) coupling these voltage potentials to the input of transmission lines 205, 212, and 225 with a source impedance. Transmission lines 205, 212, and 225 are terminated with resistive voltage dividers (e.g., resistors 208 and 209). The exemplary resistive voltage divider (termination network) comprising resistors 208 and 209 and power supply voltage potentials P2 206 and G2 207 form a Thevenin's voltage source at the node 240 coupled to input 230. This Thevenin's voltage source has a source impedance as the parallel combination of resistors 208 and 209 and a Thevenin's voltage generated from the power supply represented by the voltage between voltage potentials P2 206 and G2 207. Exemplary receivers 213 and 216 have similar termination networks to the termination network of receiver 210 comprising resistor 208 and 209 and the voltage potentials P2 206 and G2 207. The details of these termination networks are not shown for simplicity. It is understood that while the transmission lines (e.g., 205), receivers (e.g., receiver 210), and termination networks (e.g., resistors 208, 209, P2 206, and G2 207) are separable elements comprising inputs, nodes, etc. they may be shown in FIG. 2 as electrically connected where all the individual inputs, outputs, and nodes may not all have designators. For example, anyone of ordinary skill in the art would know that a transmission line (e.g., 205) has an transmission line input and a transmission line output even though a particular representation may have the transmission line input coupled to a driver output (e.g., output of driver 201) and the transmission line output coupled to a receiver input (e.g., 230) where only one of the connections has a designator.

Exemplary data input 230 is coupled to node 240 of the termination network and the output of transmission line 205 and tracks variations in power supply voltages P1 203-G1 204 and P2 206-G2 207. The receivers 210, 213 and 216 respond to the difference between their data inputs and the derived reference voltage at node 217 generated according to embodiments of the present invention. The reference voltage at node 217 is generated as the voltage division of the voltage difference on nodes 250 and 251. A driver 234 (equivalent to exemplary driver 201) has an input 222 coupled to a voltage (e.g., P1 203) that causes the output of driver 234 to transition to a voltage substantially equal to P1 203. The output of driver 234 transmits this voltage level to node 250 where it is terminated. Any noise or variations in P1 203 are also present on node 250 and are representative of variations and noise that would be present on exemplary data input 230 when it is at a logic one level. Another driver 235 (also equivalent to exemplary driver 201) has an input 223 coupled to a voltage (e.g., G1 204) that drives the output of driver 230 to a voltage substantially equal to G1 204. The output of driver 235 transmits this voltage level to node 251 where it is terminated. Any noise or variations in G1 204 are also present on node 251 and are representative of variations and noise that would be present on exemplary data input 230 when it is at a logic zero level. Nodes 250 and 251 also have noise coupled from P2 206 and G2 207 similar to noise that is coupled to exemplary data input 230. The voltage across nodes 250 and 251 is voltage divided to generate the derived reference voltage at node 217. Capacitors 231 and 232 low pass filter the derived reference voltage at node 217. The derived reference voltage at node 217 now has the same band limited noise and power supply voltage tracking as the data inputs (e.g., 230). The derived reference voltage at node 217 improves the margins for determining a logic one and logic zero and has much less variance than was achievable with the standard pseudo-differential signaling circuitry of FIG. 1.

Figure 3:
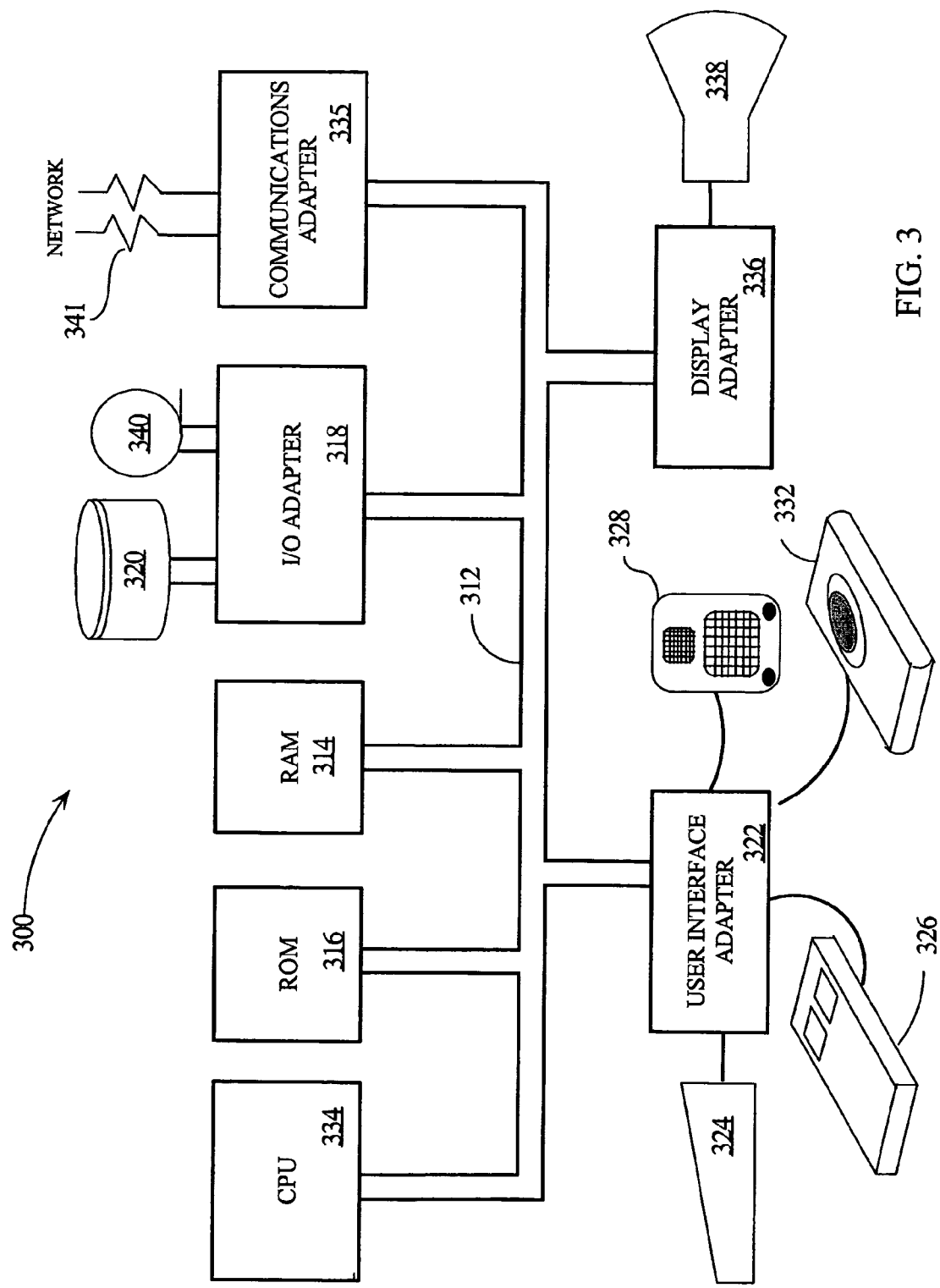
FIG. 3 is a data processing system suitable for practicing embodiments of the present invention.

FIG. 3 is a high level functional block diagram of a representative data processing system 300 suitable for practicing the principles of the present invention. Data processing system 300 includes a central processing system (CPU) 310 operating in conjunction with a system bus 312. System bus 312 operates in accordance with a standard bus protocol, such as the ISA protocol, compatible with CPU 310. CPU 310 operates in conjunction with electronically erasable programmable read-only memory (EEPROM) 316 and random access memory (RAM) 314. Among other things, EEPROM 316 supports storage of the Basic Input Output System (BIOS) data and recovery code. RAM 314 includes, DRAM (Dynamic Random Access Memory) system memory and SRAM (Static Random Access Memory) external cache. I/O Adapter 318 allows for an interconnection between the devices on system bus 312 and external peripherals, such as mass storage devices (e.g., a hard drive, floppy drive or CD/ROM drive), or a printer 340. A peripheral device 320 is, for example, coupled to a peripheral control interface (PCI) bus, and I/O adapter 318 therefore may be a PCI bus bridge. User interface adapter 322 couples various user input devices, such as a keyboard 324 or mouse 326 to the processing devices on bus 312. Display 338 which may be, for example, a cathode ray tube (CRT), liquid crystal display (LCD) or similar conventional display units. Display adapter 336 may include, among other things, a conventional display controller and frame buffer memory. Data processing system 300 may be selectively coupled to a computer or telecommunications network 341 through communications adapter 334. Communications adapter 334 may include, for example, a modem for connection to a telecom network and/or hardware and software for connecting to a computer network such as a local area network (LAN) or a wide area network (WAN). CPU 310 and other components of data processing system 300 may contain logic circuitry in two or more integrated circuit chips that are separated by a significant distance relative to their communication frequency such that pseudo-differential signaling is used to improve reliability. The power supply voltages of the two or more integrated circuits may undergo different unregulated variations wherein communication signal detection is improved by employing derived reference circuits according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A circuit for signaling between a first integrated circuit (IC) chip powered by a first power supply voltage and a second IC chip powered by a second power supply voltage comprising:
   a differential receiver in the second IC chip having a reference input and a data input coupled to a data output of a first driver in the first IC chip;
   a first termination network having a first terminator node coupled to the data input, the first terminator node generating a Thevenin's voltage source from the second power supply voltage;
   a second termination network having a second terminator node generating a Thevenin's voltage source from the second power supply, the second terminator node coupled to a positive potential of the first power supply voltage with a source impedance in the first IC chip;
   a third termination network having a third terminator node generating a Thevenin's voltage source from the second power supply, the third terminator node coupled to a ground potential of the first power supply voltage source impedance in the first IC chip; and
   a voltage divider network having an output node coupled to the reference input of the differential receiver, a first impedance coupled between the second terminator node and the output node, and a second impedance coupled between the third terminator node and the output node.

2. The circuit of claim 1, wherein the data output of the first driver has a first source impedance and generates a data signal that is transmitted over a first transmission line having an input coupled to the data output of the first driver and an output coupled to the first terminator node.

3. The circuit of claim 2, wherein the positive potential of the first power supply voltage is generated as the logic one output of a second driver in the first IC chip with a second source impedance, wherein the logic one output of a second driver is transmitted over a second transmission line having an input coupled to the output of the second driver and an output coupled to the second terminator node.

4. The circuit of claim 3, wherein the ground potential of the first power supply voltage is generated as the logic zero output of a third driver in the first IC chip with a third source impedance, wherein the logic zero output of a third driver is transmitted over a third transmission line having an input coupled to the output of the third driver and an output coupled to the third terminator node.

5. The circuit of claim 1, wherein the first impedance comprises a first resistor coupled in parallel with a first capacitor and the second impedance comprises a second resistor coupled in parallel with a second capacitor.

6. The circuit of claim 1, wherein the first, second, and third drivers are equivalent drivers and the first, second, and third source impedances are substantially equal to the source impedance.

7. The circuit of claim 1, wherein the first, second, and third termination networks are equivalent networks.

8. The circuit of claim 7, wherein the first terminator network comprises:
   a first resistor coupled from the first terminator node to a positive potential of the second power supply voltage; and
   a second resistor coupled from the first terminator node to a ground potential of the second power supply voltage.

9. The circuit of claim 4, wherein a Thevenin's source resistance of the Thevenin's voltage source is substantially equal to the characteristic impedance of the first, second, and third transmission lines.

10. The circuit of claim 1, wherein the second power supply voltage is generated as the result of distributing the first power supply voltage over a power supply distribution network.

11. A data processing system comprising:
   a central processing unit (CPU);
   a random access memory (RAM);
   an input output (I/O) interface unit; and
   a bus for coupling the CPU, RAM and I/O interface unit, the data processing system having circuitry for communicating between a first integrated circuit (IC) chip powered by a first power supply voltage and a second IC chip powered by a second power supply voltage, wherein the circuitry includes a differential receiver in the second IC chip having a reference input and a data input coupled to a data output of a first driver in the first IC chip, a first termination network having a first terminator node coupled to the data input, the first terminator node generating a Thevenin's voltage source from the second power supply voltage, a second termination network having a second terminator node generating a Thevenin's voltage source from the second power supply, the second terminator node coupled to a positive potential of the first power supply voltage with a source impedance in the first IC chip, a third termination network having a third terminator node generating a Thevenin's voltage source from the second power supply, the third terminator node coupled to a ground potential of the first power supply voltage source impedance in the first IC chip, and a voltage divider network having an output node coupled to the reference input of the differential receiver, a first impedance coupled between the second terminator node and the output node, and a second impedance coupled between the third terminator node and the output node.

12. The data processing system of claim 11, wherein the data output of the first driver has a first source impedance and generates a data signal that is transmitted over a first transmission line having an input coupled to the data output of the first driver and an output coupled to the first terminator node.

13. The data processing system of claim 12, wherein the positive potential of the first power supply voltage is generated as the logic one output of a second driver in the first IC chip with the second source impedance, wherein the logic one output of a second driver is transmitted over a second transmission line having an input coupled to the output of the second driver and an output coupled to the second terminator node.

14. The data processing system of claim 13, wherein the ground potential of the first power supply voltage is generated as the logic zero output of a third driver in the first IC chip with the third source impedance, wherein the logic zero output of a third driver is transmitted over a third transmission line having an input coupled to the output of the third driver and an output coupled to the third terminator node.

15. The data processing system of claim 11, wherein the first impedance comprises a first resistor coupled in parallel with a first capacitor and the second impedance comprises a second resistor coupled in parallel with a second capacitor.

16. The data processing system of claim 11, wherein the first, second, and third drivers are equivalent drivers and the first, second, and third source impedances are substantially equal.

17. The data processing system of claim 11, wherein the first, second and third termination networks are equivalent networks.

18. The data processing system of claim 17, wherein the first terminator network comprises:

a first resistor coupled from the terminator node to a positive potential of the second power supply voltage; and a second resistor coupled from the terminator node to a ground potential of the second power supply voltage.

19. The data processing system of claim 14, wherein a Thevenin's source resistance of the Thevenin's voltage source is substantially equal to the characteristic impedance of the first, second, and third transmission lines.

20. An integrated circuit (IC) having communication circuits powered by a first power supply voltage comprising:

a differential receiver having a reference input, and a data input receiving a data signal from circuitry powered by a second power supply voltage, wherein the differential receiver generates a detected data signal as the amplified difference between the data input and the reference input;

a first network having a first terminator node coupled to the data input, the first terminator node generating a Thevenin's equivalent voltage referenced to the first power supply voltage with a Thevenin's equivalent source resistance;

a second termination network having a second terminator node coupled to a positive potential of the second power voltage with a first source impedance and generating the Thevenin's equivalent voltage referenced to the first power supply with the Thevenin's equivalent source resistance;

a third termination network having a third terminator node coupled to a ground potential of the second power supply voltage with second source impedance and generating the Thevenin's equivalent voltage referenced to the first power supply with the Thevenin's equivalent source resistance; and a voltage divider network having an output node coupled to the reference input of the differential receiver, a first impedance coupled between the first terminator node and the output node, and a second impedance coupled between the second terminator node and the output node, wherein the output node generates a reference voltage as the voltage divided difference between the first terminator node and the second terminator node.

* * * * *